(12) United States Patent
Guo et al.

(10) Patent No.: US 11,385,496 B2
(45) Date of Patent: Jul. 12, 2022

(54) LIQUID CRYSTAL DISPLAY PANEL AND DISPLAY DEVICE

(71) Applicants: Wuhan BOE Optoelectronics Technology Co., Ltd., Hubei (CN); BOE TECHNOLOGY GROUP CO., LTD., Beijing (CN)

(72) Inventors: Yuanhui Guo, Beijing (CN); Yujie Gao, Beijing (CN); Lei Guo, Beijing (CN); Zhangtao Wang, Beijing (CN); Yanping Liao, Beijing (CN)

(73) Assignees: Wuhan BOE Optoelectronics Technology Co., Ltd., Wuhan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/933,694

(22) Filed: Jul. 20, 2020

(65) Prior Publication Data
US 2021/0063814 A1    Mar. 4, 2021

(30) Foreign Application Priority Data
Aug. 29, 2019   (CN) .......................... 201910806769.5

(51) Int. Cl.
G02F 1/1335 (2006.01)
G02F 1/1362 (2006.01)
G02F 1/13357 (2006.01)

(52) U.S. Cl.
CPC .. *G02F 1/133528* (2013.01); *G02F 1/133504* (2013.01); *G02F 1/133602* (2013.01); *G02F 1/136286* (2013.01); *G02F 2202/28* (2013.01)

(58) Field of Classification Search
CPC .......... G02F 1/133528; G02F 1/133504; G02F 1/133602; G02F 1/136286; G02F 2202/28
See application file for complete search history.

(56) References Cited

U.S. PATENT DOCUMENTS

2006/0238484 A1    10/2006  Yu et al.
2017/0190972 A1*   7/2017   Kuriyama .......... C09K 19/3814
(Continued)

FOREIGN PATENT DOCUMENTS

CN    108957841 A    12/2018
CN    108983463 A    12/2018
(Continued)

OTHER PUBLICATIONS

State Intellectual Property Office of the People's Republic of China, Office Action and Search Report Issued in Application No. 201910806769.5, dated Nov. 2, 2021, 12 pages. (Submitted with Partial Translation).

*Primary Examiner* — Nathanael R Briggs
(74) *Attorney, Agent, or Firm* — McCoy Russell LLP

(57) ABSTRACT

The present disclosure provides a liquid crystal display panel and a display device, including: a liquid crystal panel, a light control panel, and a polarizer located on a surface of the liquid crystal panel away from the light control panel that are stacked, in which the polarizer includes a pressure-sensitive adhesive layer in contact with the liquid crystal panel, and the pressure-sensitive adhesive layer has a light adjustment structure configured to adjust a propagation path of light emitted from the liquid crystal panel by means of refraction or total reflection. The liquid crystal display panel provided by the present disclosure can improve or even eliminate the rainbow pattern phenomenon, and improve the display quality of the liquid crystal display panel.

11 Claims, 5 Drawing Sheets

(56) References Cited

U.S. PATENT DOCUMENTS

| 2019/0162997 A1* | 5/2019 | Asakura ................ G02F 1/1681 |
| 2019/0285937 A1* | 9/2019 | Fuchida ................ G02F 1/1335 |
| 2020/0292894 A1 | 9/2020 | Liu et al. |
| 2021/0141267 A1 | 5/2021 | Zhan et al. |

FOREIGN PATENT DOCUMENTS

| CN | 109298573 A | 2/2019 |
| CN | 109471300 A | 3/2019 |
| CN | 110111749 A | 8/2019 |

* cited by examiner

LIQUID CRYSTAL DISPLAY PANEL AND DISPLAY DEVICE

CROSS-REFERENCE TO RELATED APPLICATION

The present application claims priority to Chinese Patent Application No. 201910806769.5 filed on Aug. 29, 2019. The entire contents of the above-listed application is hereby incorporated by reference for all purposes.

TECHNICAL FIELD

The present disclosure relates to the field of display technology, in particular, to a liquid crystal display panel and a display device.

BACKGROUND

Liquid crystal display (LCD) has attracted the attention of the display industry due to its advantages of small size, low power consumption, and no radiation. The new Dual Cell 4K ultra-high-definition liquid crystal display, which is currently launched, is a new breakthrough in TFT-LCD technology. By adopting megapixel partitioning technology, the display can achieve hundreds of thousands of ultra-high dynamic contrast; at the same time, the color depth can reach 12 bit, and the low grayscale transitions naturally, so a better color display can be achieved, thereby making every display detail vigorous and lively. The liquid crystal display adopts Dual Cell technology and HDR (High Dynamic Range Rendering) technology, it can make the bright part of the image brighter and the dark part of the image darker, and achieve ultra-high contrast of 160000:1. The detail performance capability creates a new peak in display technology, and the quality experience is comparable to organic light-emitting display panels.

SUMMARY

In an aspect, a liquid crystal display panel provided by the present disclosure includes: a liquid crystal panel, a light control panel, and a polarizer located on a surface of the liquid crystal panel away from the light control panel that are stacked, in which the polarizer includes a pressure-sensitive adhesive layer in contact with the liquid crystal panel, the pressure-sensitive adhesive layer has a light adjustment structure configured to adjust a propagation path of light emitted from the liquid crystal panel by means of refraction or total reflection.

Optionally, the light adjustment structure includes a plurality of spherical particles for scattering light, and the spherical particles are uniformly distributed in the pressure-sensitive adhesive layer.

Optionally, a diameter of each spherical particle for scattering light is in a range from 1 µm to 40 µm.

Optionally, the pressure-sensitive adhesive layer includes a plurality of strip-shaped columnar pressure-sensitive adhesive structures and a plurality of strip-shaped columnar via holes that are closely arranged alternately, and the light adjustment structure includes a plurality of columnar scattering structures filled in the plurality of strip-shaped columnar via holes.

Optionally, the pressure-sensitive adhesive layer includes a plurality of columnar via holes distributed in an array, and the light adjustment structure includes a plurality of columnar scattering structures filled in the plurality of columnar via holes.

Optionally, a width of the columnar scattering structure is in a range from 1 µm to 40 µm, and a height of the columnar scattering structure is in a range from 10 µm to 100 µm.

Optionally, a ratio of a weight of the light adjustment structure to a weight of the pressure-sensitive adhesive layer is in a range from 5% to 15%.

Optionally, a refractive index of the light adjustment structure is in a range from 1.5 to 2.0.

Optionally, a material of the light adjustment structure is a transparent material.

Optionally, the transparent material is acrylic resin or silica.

Optionally, the polarizer further includes a first protective film layer, a polyvinyl alcohol film layer and the second protective film layer that are sequentially stacked on a surface of the pressure-sensitive adhesive layer away from the liquid crystal panel.

Optionally, the light control panel includes a plurality of signal lines extending along a first direction and a second direction that cross each other, and the plurality of signal lines is a zigzag wiring.

Optionally, the light control panel further includes a plurality of light control units defined by the plurality of signal lines that are intersected, in which the liquid crystal panel includes a plurality of grid lines extending along the first direction and the second direction that cross each other, the plurality of grid lines defines a plurality of sub-pixel units, N of the plurality of sub-pixel units continuously arranged along the first direction form one pixel unit, and N is a positive integer; in which the plurality of pixel units and the plurality of light control units are arranged in an array; in which along the first direction, a maximum length of one of the plurality of light control units is m times a length of one of the plurality of pixel units; along the second direction, a width of one of the plurality of light control units is n times a length of one of the plurality of pixel units; and m and n are positive integers.

In another aspect, an embodiment of the present disclosure also provides a display device including a backlight module and the liquid crystal display panel provided by according to any one of the above embodiments of the present disclosure, in which the backlight module is located on a surface of the light control panel away from the liquid crystal display panel.

DETAILED DESCRIPTION

Figure 1:
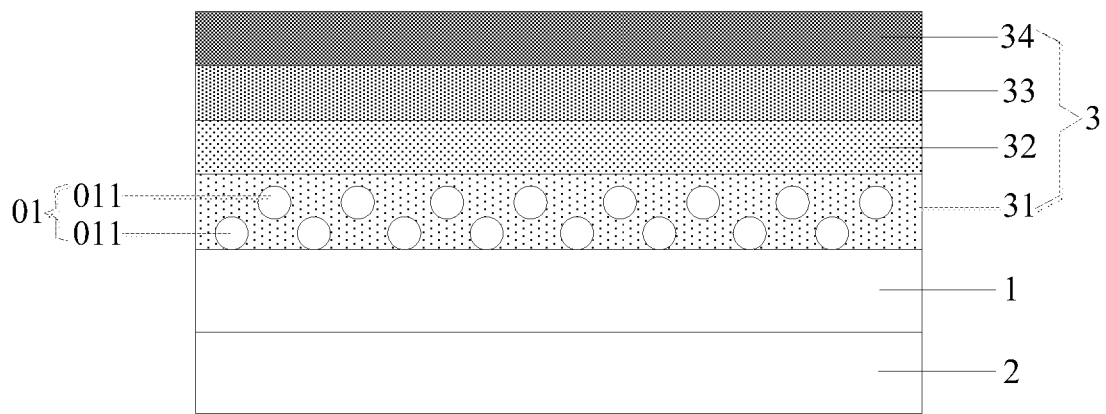
FIG. 1 is a schematic view showing the structure of the liquid crystal display panel according to an embodiment of the present disclosure.

In order to illustrate the purposes, technical solution and advantages of the present disclosure in a clearer manner, the specific implementation of the liquid crystal display panel and the display device provided by the embodiments of the present disclosure will be described in detail in conjunction with the drawings. The thickness and shape of each film in the drawings do not reflect the true scale of the liquid crystal display panel, and the purpose is only to illustrate the present disclosure.

In the related art, the liquid crystal display panel includes a liquid crystal panel and a backlight module. Generally, a liquid crystal panel includes an array substrate and a counter substrate (for example, a color filter substrate) that are oppositely arranged to form a liquid crystal cell, and a liquid crystal layer is filled between the array substrate and the counter substrate. Both the counter substrate and the array substrate are provided with polarizers, and the polarization directions of the two polarizers are perpendicular to each other. The backlight module is arranged on the non-display surface of the liquid crystal panel, and configured to provide a planar light source for the liquid crystal panel. The liquid crystal molecules of the liquid crystal layer are twisted by the driving electric field formed between the pixel electrode provided on the array substrate and the common electrode provided on the array substrate or the common electrode provided on the counter substrate, to control the polarization direction of light. In addition, with the cooperation of two polarizers, the liquid crystal molecules also control the transmittance of light, to achieve grayscale display. The backlight module may be a direct type backlight module or an edge type backlight module. The direct type backlight module includes a plurality of point light sources (for example, LEDs) that are arranged in parallel and a diffusion plate. The light emitted by these point-shaped light sources is uniformized by the diffusion plate, and then enters the liquid crystal panel for display.

For example, for a liquid crystal display panel, a direct backlight module can be controlled by combining local dimming (LD) technology, to improve the display quality of the display panel. The local dimming technology can not only reduce the power consumption of the display panel, but also realize the dynamic dimming of the backlight area, thereby greatly improving the contrast of the displayed image, and improving the display quality of the display panel. The use of peak drive technology on the basis of local dimming technology can further improve the contrast of the displayed image and give users a better visual experience.

Local dimming technology can divide the entire backlight module into a plurality of individually drivable backlight blocks, each of which includes one or more LEDs. According to the gray scales required to be displayed in different parts of the display screen, the driving current of the LEDs of the backlight blocks corresponding to these parts is automatically adjusted, to realize the individual adjustment of the brightness of each block in the backlight unit, thereby improving the contrast of the display screen.

However, the local dimming technology is suitable for direct type backlight modules, and LEDs as light sources are evenly distributed across the backplane, for example. In order to use the local dimming technology in, for example, an edge backlight module, a light control panel needs to be added between the liquid crystal panel and the edge backlight module. The light control panel can control the light transmittance in a predetermined area. For the portion of the LCD panel with higher screen brightness (gray scale), the light transmittance of the corresponding area of the light control panel is also high, thereby allowing more light from the backlight unit to pass through. For the portion of the liquid crystal panel with lower screen brightness, the light transmittance of the corresponding area of the light control panel is also low, thereby allowing less light from the backlight module to pass through. This improves the contrast of the display screen and enhances the display image quality. In addition, in the case that the direct type backlight module is formed directly on the direct type backlight source, it is difficult to divide the backlight module to achieve a high density (the number of backlight modules per unit area) and accuracy. When the division density and precision requirements of the division of the light control unit in the light control panel are high, these requirements can be achieved by using the light control panel, and the manufacturing process of the light control panel is easy to realize.

The liquid crystal display panel of the dual-cell structure includes a liquid crystal panel and a light control panel, and both the liquid crystal panel and the light control panel are provided with a BM layer. The grid patterns of the two layers of BM that are stacked are prone to generate a moire pattern. In order to avoid poor moire pattern, the BM design of the LCD panel and the light control panel are different. The BM of the liquid crystal panel is the same as that of ordinary products, and the BM of the light control panel is a zigzag shape cyclically arranged, so that the BM in the liquid crystal panel and the BM in the light control panel do not have the same or similar patterns. In this way, the human eye cannot feel the moire pattern, thereby achieving the effect of eliminating or improving the moire pattern. In ordinary liquid crystal display products, the aperture ratios of sub-pixel units of different colors are generally the same, so that ordinary liquid crystal display products emit uniform white light. However, due to the cyclic arrangement of the zigzag shape of BM in the light control panel, in one cycle period, the degree of occlusion of the zigzag BM in the light control panel to the sub-pixel units of different colors in the liquid crystal panel observed by the human eye at different viewing angles, so that different color sub-pixel units have different aperture ratios. In this way, the light output rates of the sub-pixel units of different colors are different, resulting in a difference between the color temperature of light emitted from liquid crystal panel and the white light color temperature of the ordinary liquid crystal display products, thereby causing the rainbow pattern phenomenon on the liquid crystal panel.

In view of this, an embodiment of the present disclosure provides a liquid crystal display panel, as shown in FIGS. 1 to 4, including: a liquid crystal panel 1, a light control panel 2, and a polarizer 3 located on a surface of the liquid crystal panel 1 away from the light control panel 2 that are stacked, in which the polarizer 3 includes a pressure-sensitive adhesive layer 31 in contact with the liquid crystal panel 1, the pressure-sensitive adhesive layer 31 has a light adjustment structure 01 configured to adjust a propagation path of light emitted from the liquid crystal panel 1 by means of refraction or total reflection.

The liquid crystal display panel provided by the embodiments of the present disclosure adjusts the propagation path of light emitted from the liquid crystal panel by providing a light adjustment structure in the pressure-sensitive adhesive layer, and the light emitted from the vertical and inclined viewing angles of the liquid crystal panel can be mixed and emitted uniformly after pass through the light adjustment structure, so that the light output rate and the color performance of the sub-pixel unit in the liquid crystal panel viewed from different angles by the human eye is same and uniform. Therefore, the liquid crystal display panel provided by the embodiments of the present disclosure can improve or even eliminate the rainbow pattern phenomenon, and improve the display quality of the liquid crystal display panel. In addition, in the above-mentioned liquid crystal display panel provided by the embodiments of the present disclosure, in order to improve the rainbow pattern phenomenon without adding a new film layer, the setting the light adjustment structure in the pressure-sensitive adhesive layer of the polarizer on the surface of the liquid crystal panel away from the light control panel can realize the thin and light design of the liquid crystal display panel.

Optionally, the light adjustment structure includes particulate material dispersed in the pressure-sensitive adhesive layer. For example, the light adjustment structure includes spherical particles uniformly dispersed in the pressure-sensitive adhesive layer, or a plurality of columnar scattering structures filled in the strip-shaped columnar via holes arranged in the pressure-sensitive adhesive layer at intervals, for example, a cylindrical scattering structure.

Figure 2:
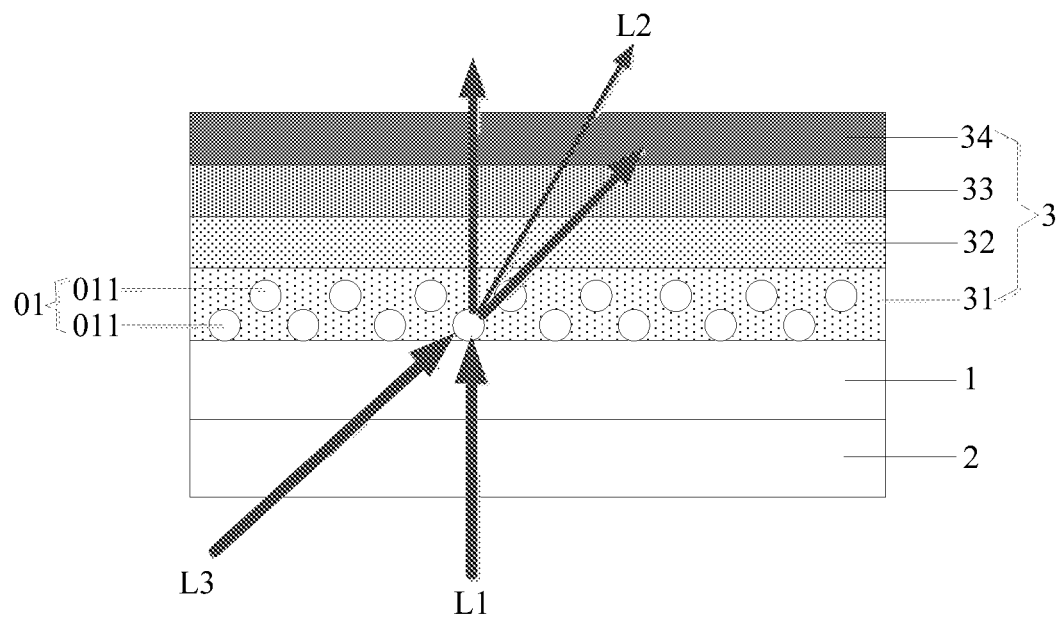
FIG. 2 is a schematic view showing the structure of the liquid crystal display panel according to another embodiment of the present disclosure.

Optionally, the light adjustment structure includes a plurality of spherical particles for scattering light, and the spherical particles are uniformly distributed in the pressure-sensitive adhesive layer. Specifically, as shown in FIG. 1, the light adjustment structure 01 may include a plurality of spherical particles for scattering light 011, and each of the plurality of spherical particles 011 is uniformly distributed in the pressure-sensitive adhesive layer 31. FIG. 2 is a schematic diagram showing the propagation path of the backlight emitted by the backlight module in the pressure-sensitive adhesive layer in the liquid crystal display panel shown in FIG. 1. Specifically, as shown in FIG. 2, since the backlight emitted by the backlight module is divergent, there is light at various angles. When the backlight L1 irradiates each spherical particle 011 in the pressure-sensitive adhesive layer 31 along the vertical viewing angle direction, the backlight L1 in the vertical viewing angle direction is refracted and deflected toward the backlight L2 in the inclined viewing angle direction. The backlight L2 is mixed with the backlight L3 in the inclined viewing angle direction, that is, the scattered backlight L1 in the vertical viewing angle direction can be mixed with the backlight L3 in the inclined viewing angle direction. Therefore, the embodiments of the present disclosure improve the rainbow pattern phenomenon by improving the exiting angle of the backlight L1 in the vertical viewing angle direction. When the observer views the screen from the inclined viewing angle direction, the backlight L1 in the vertical viewing angle direction and the backlight L3 in the inclined viewing angle direction can be collected at the same time. That is, after passing through the light adjustment structure 01, the backlight emitted from the vertical viewing angle direction of the liquid crystal panel 1 can be uniformly mixed with the backlight of the inclined viewing angle direction, so that the light output rate and the color performance of the sub-pixel unit in the liquid crystal panel 1 viewed from different angles by the human eye is same and uniform, thereby improving the rainbow pattern phenomenon.

Optionally, a diameter of each spherical scattering particle is in a range from 1 μm to 40 μm. In the above liquid crystal display panel provided by the embodiment of the present invention, setting the diameter of the spherical scattering particles within the above range does not affect the inherent properties of each film layer in the polarizer, and at the same time, it can effectively improve the rainbow pattern phenomenon.

Figure 3A:
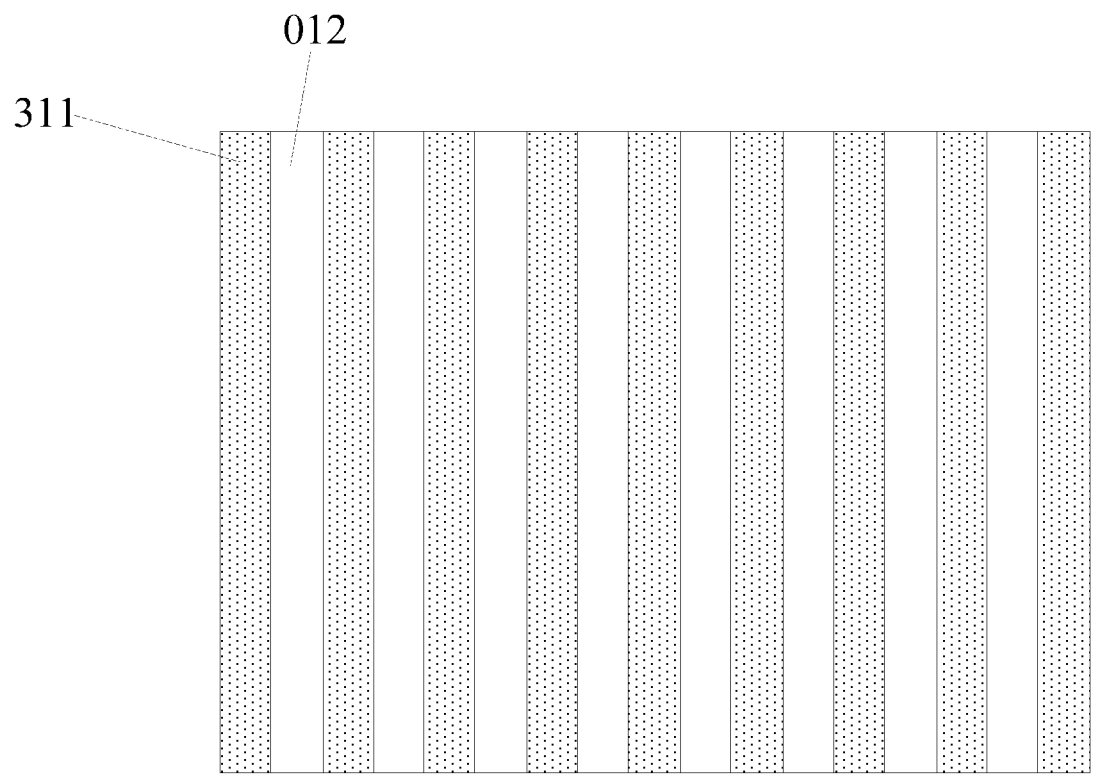
FIG. 3A is a schematic view showing the top view of the structure of the liquid crystal display panel according to an embodiment of the present disclosure.
Figure 3B:
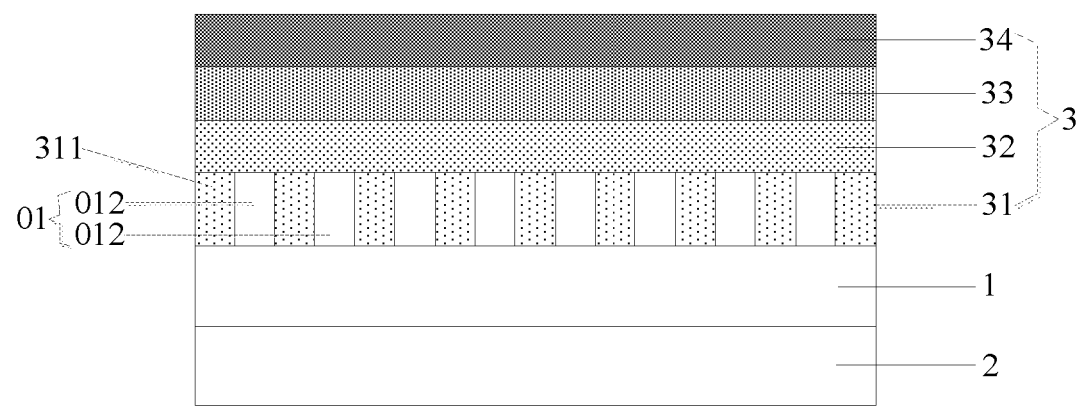
FIG. 3B is a schematic view showing the structure of the pressure-sensitive adhesive layer in the liquid crystal display panel according to an embodiment of the present disclosure.
Figure 4:
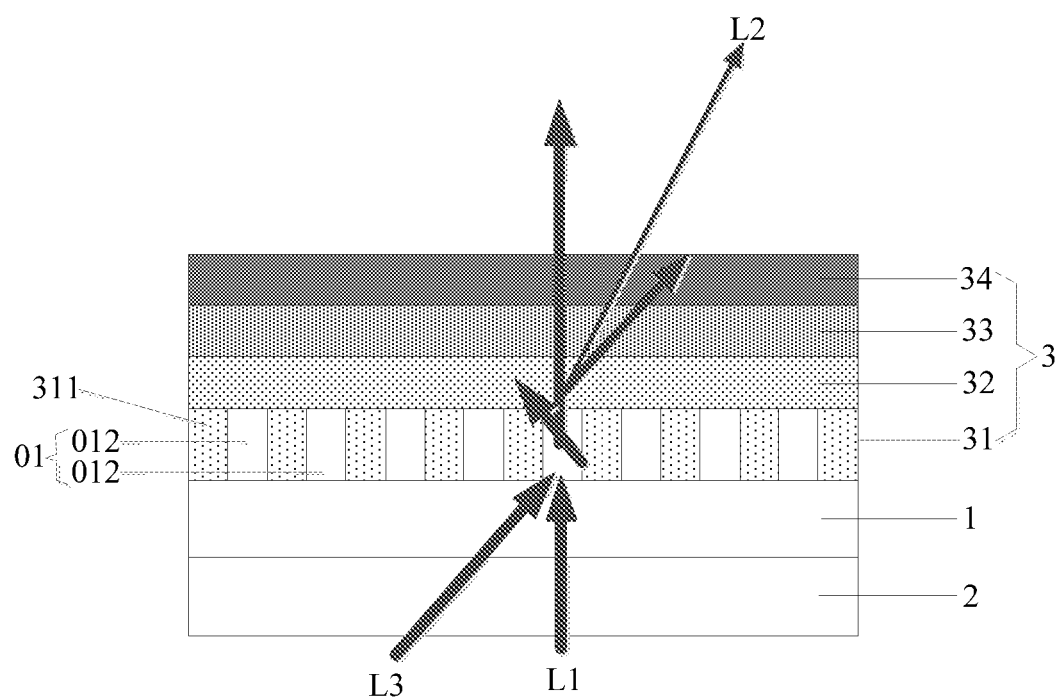
FIG. 4 is a schematic view showing the structure of the liquid crystal display panel according to yet another embodiment of the present disclosure.

Optionally, the pressure-sensitive adhesive layer includes a plurality of strip-shaped columnar pressure-sensitive adhesive structures and a plurality of strip-shaped columnar via holes that are closely arranged alternately, and the light adjustment structure includes a plurality of columnar scattering structures filled in the plurality of strip-shaped columnar via holes. FIG. 3A is a schematic view showing the top view of the structure of the pressure-sensitive adhesive layer in the liquid crystal display panel according to an embodiment of the present disclosure, and FIG. 3B is a schematic view showing the cross-sectional structure of the liquid crystal display panel shown in FIG. 3A. As shown in FIGS. 3A and 3B, the pressure-sensitive adhesive layer 31 includes a plurality of strip-shaped columnar pressure-sensitive adhesive structures 311 and a plurality of strip-shaped columnar via holes that are closely arranged alternately, and the light adjustment structure 01 includes a plurality of columnar scattering structures 012 filled in the plurality of strip-shaped columnar via holes. FIG. 4 is a schematic diagram showing the propagation path of the backlight emitted by the backlight module in the pressure-sensitive adhesive layer in the liquid crystal display panel shown in FIG. 3B. As shown in FIG. 4, since the backlight emitted by the backlight module is divergent, there is light emitted from all angles. In the case that the backlight L3 along the inclined viewing angle direction illuminates each columnar scattering structure 012 in the pressure-sensitive adhesive layer 31, since the columnar scattering structures 012 and the columnar pressure-sensitive adhesive structures 311 are closely arranged alternately to form an alternating sparse medium and dense medium, total reflection occurs when the backlight L3 of the inclined viewing angle direction enters the interface between the columnar scattering structure 012 and the columnar pressure-sensitive adhesive structure 311, and finally is breaks through the threshold to exiting from the top of the interface (L2), and the angle of the backlight L2 exiting from the top of the interface decreases. Therefore, the liquid crystal display panel can reduce the emitting angle of the backlight L3 in the inclined viewing angle direction (the angle between the emitted light and the panel normal), thereby mixing the backlight L3 in the inclined viewing angle direction and the backlight L1 in the vertical viewing angle direction. That is, the rainbow pattern phenomenon is improved by improving the exiting angle of the backlight L3 in the inclined viewing angle direction. When the observer views the screen from the inclined viewing angle direction, the backlight L1 in the vertical viewing angle direction and the backlight L3 in the inclined viewing angle direction can be collected at the same time. That is, after passing through the light adjustment structure 01, the backlight emitted from the inclined viewing angle direction of the liquid crystal panel 1 can be uniformly mixed with the backlight of the vertical viewing angle direction, so that the color performance of the sub-pixel unit in the liquid crystal panel 1 viewed from different angles by the human eye is uniform, thereby improving the rainbow pattern phenomenon.

Figure 3C:
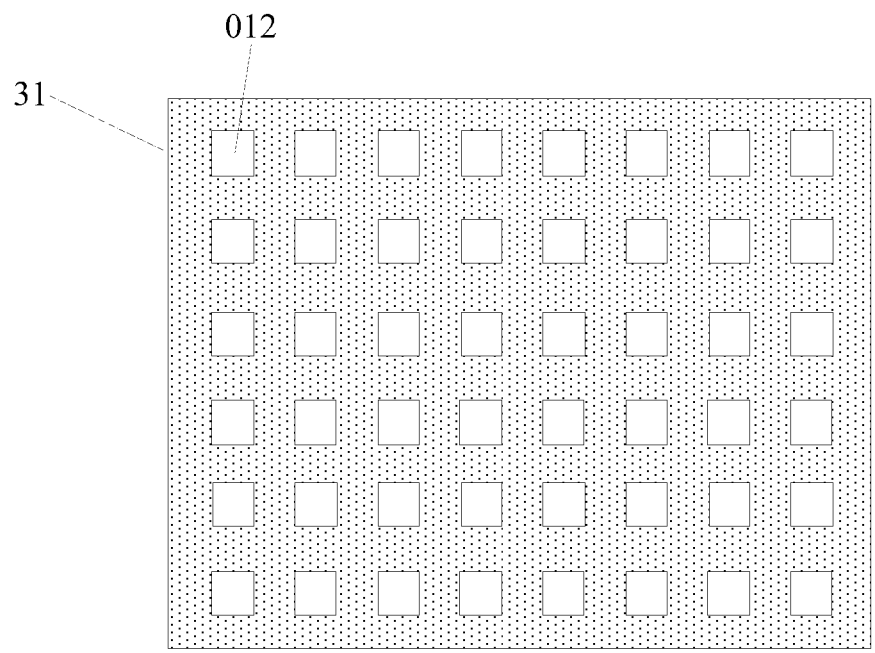
FIG. 3C is a schematic view showing the top view of the structure of the pressure-sensitive adhesive layer in the liquid crystal display panel according to an embodiment of the present disclosure.

Optionally, the pressure-sensitive adhesive layer includes a plurality of columnar via holes distributed in an array, and the light adjustment structure includes a plurality of columnar scattering structures filled in the plurality of columnar via holes. FIG. 3C is a schematic view showing the top view of the structure of the pressure-sensitive adhesive layer in the liquid crystal display panel according to an embodiment of the present disclosure, and FIG. 3B is a schematic view showing the cross-sectional structure of the liquid crystal display panel shown in FIG. 3C. As shown in FIGS. 3C and 3B, the pressure-sensitive adhesive layer 31 includes a plurality of columnar via holes distributed in an array, and the light adjustment structure 01 includes a plurality of columnar scattering structures filled in the plurality of columnar via holes 012. The principle of the structure shown in FIG. 3C provided by the embodiment of the present disclosure for achieving the improvement of the rainbow pattern phenomenon is the same as the principle of the structure shown in FIG. 3A for achieving the improvement of the rainbow pattern phenomenon, and both of them are to form high and low refractive index interfaces (i.e., sparse and dense mediums) in the pressure-sensitive adhesive layer 31. For the specific principle, please refer to the above content, which will not be repeated herein.

Optionally, a width of the columnar scattering structure is in a range from 1 μm to and a height of the columnar scattering structure is in a range from 10 μm to 100 μm. Optionally, the columnar scattering structure is a cylindrical structure, whereby the width is the diameter of the cylindrical structure, and the height is the height in a direction perpendicular to the diameter direction of the cylindrical shape. In the above-mentioned liquid crystal display panel provided by the embodiments of the present disclosure, the width and height of the columnar scattering structure within the above range does not affect the inherent properties of each film layer in the polarizer, and at the same time, it can effectively improve the rainbow pattern phenomenon.

The above two embodiments for solving the rainbow pattern phenomenon provided by the embodiments of the present disclosure can be applied to different scenarios. For example, when the brightness requirement of the vertical viewing angle is higher, columnar directional columnar scattering structures may be used, and when the brightness requirement of the inclined viewing angle is higher, spherical dispersive particles may be used.

Optionally, a ratio of a weight of the light adjustment structure to a weight of the pressure-sensitive adhesive layer is in a range from 3% to 20%. Optionally, a ratio of a weight of the light adjustment structure to a weight of the pressure-sensitive adhesive layer is in a range from 5% to 15%. Optionally, a ratio of a weight of the light adjustment structure to a weight of the pressure-sensitive adhesive layer is 10%. In the above liquid crystal display panel provided by the embodiment of the present disclosure, the ratio of the weight of the light adjustment structure to the weight of the pressure-sensitive adhesive layer within the above range does not affect the inherent properties of each film layer in the polarizer, and at the same time, it can effectively improve the rainbow pattern phenomenon. In particular, when the ratio of the weight of the light adjustment structure to the weight of the pressure-sensitive adhesive layer is 10%, a more excellent effect can be obtained.

Optionally, a refractive index of the light adjustment structure is in a range from 1.5 to 2.0. In the above liquid crystal display panel provided by the embodiment of the present disclosure, in order to ensure that the backlight can better change the propagation path of the backlight when the backlight enters the light adjustment structure in the pressure-sensitive adhesive layer, the refractive index of the light adjustment structure is in a range from 1.5 to 2.0. As shown in FIGS. 1 and 2, generally, the refractive index of the pressure-sensitive adhesive layer 31 is relatively low, and spherical particles 011 with a relatively high refractive index (1.5 to 2.0) are uniformly distributed in the pressure-sensitive adhesive layer 31. When the backlight in the vertical viewing angle direction is irradiated to the spherical particles 011, it will be refracted, so that the backlight in the vertical viewing angle direction and the backlight in the inclined viewing angle direction are mixed and emitted uniformly, thereby improving the rainbow pattern phenomenon. As shown in FIGS. 3A to 4, the spherical particles 011 with a relatively high refractive index (1.5 to 2.0) are evenly distributed in the pressure-sensitive adhesive layer 31, and the columnar scattering structure 012 and the columnar pressure-sensitive adhesive structure 311 can form high and low refractive index interfaces (i.e., sparse and dense mediums). When the backlight L3 in the inclined viewing angle direction is incident on the interface of the columnar scattering structure 012 and the columnar pressure-sensitive adhesive structure 311, total reflection occurs, and finally it exits at a reduced angle, allowing the backlight in the inclined viewing angle direction and the backlight in the vertical viewing angle direction are uniformly mixed and emitted, so that the light output rate and the color performance of the sub-pixel unit in the liquid crystal panel viewed from different angles by the human eye is same and uniform, thereby improving the rainbow pattern phenomenon.

Optionally, in order not to affect the transmittance of the polarizer, in the liquid crystal display panel provided by the embodiments of the present disclosure, the material of the light adjustment structure is a transparent material.

Optionally, in the above liquid crystal display panel provided by an embodiment of the present disclosure, the transparent material may be acrylic resin or silica.

The current 65-inch liquid crystal display panel is taken as an example. The resolution of the liquid crystal panel is ultra definition (UD), and the resolution of the light control panel is full high definition (FHD). The signal line of the light control panel is designed with a zigzag wiring, and the angle of the zigzag wiring is 63°. The level of the rainbow pattern phenomenon of whether the light adjustment structure is provided in the pressure-sensitive adhesive layer is determined by the structure of the liquid crystal display panel in the related art and the structure of the liquid crystal display panel provided by the embodiments of the present disclosure. The better the effect of improving the rainbow pattern, the lower the level value of the rainbow pattern.

Embodiment 1: a solution in the related art, in which the thickness of the pressure-sensitive adhesive layer is 25 and the pressure-sensitive adhesive layer is not doped with any optical material.

Embodiment 2: a solution of the present disclosure, in which the thickness of the pressure-sensitive adhesive layer is 25 μm, the high-refractive-index spherical scattering particles with a mass ratio of 10% is doped in the pressure-sensitive adhesive layer, and the refractive index of the spherical dispersion particles is 2.0.

Embodiment 3: a solution of the present disclosure, in which the thickness of the pressure-sensitive adhesive layer is 25 μm, the high-refractive-index columnar scattering structure with a mass ratio of 10% is doped in the pressure-sensitive adhesive layer, and the refractive index of the columnar scattering structure is 2.0.

The rainbow pattern level is judged by human eyes. The rainbow pattern level of Embodiment 1 is Level 3; the rainbow pattern level of Embodiment 2 is Level 0.5; and the rainbow pattern level of Embodiment 3 is Level 0.5. Through optical tests, the brightness of the vertical viewing angle is 350 nit, and the brightness of the inclined viewing angle ($\theta=60°$, $\varphi=0°$ is 50 nit in Embodiment 1; the brightness of the vertical viewing angle is 325 nit, and the brightness of the inclined viewing angle ($\theta=60°$, $\varphi=0°$ is 60 nit in Embodiment 2; and the brightness of the vertical viewing angle is 380 nit, and the brightness of the inclined viewing angle ($\theta=60°$, $\varphi=0°$ is 30 nit in Embodiment 3.

Therefore, as can be seen from the above embodiments, the liquid crystal display panel of the present disclosure can effectively improve the rainbow pattern defects.

Optionally, the polarizer further includes a first protective film layer, a polyvinyl alcohol film layer and the second protective film layer that are sequentially stacked on a surface of the pressure-sensitive adhesive layer away from the liquid crystal panel. As shown in FIGS. 1 to 4, the polarizer 3 of the embodiment of the present disclosure further includes a first protective film layer 32, a polyvinyl alcohol film layer 33 and the second protective film layer 34 that are sequentially stacked on a surface of the pressure-sensitive adhesive layer 31 away from the liquid crystal panel 1. The first protective film layer 32 may be a single-layer coated pressure-sensitive adhesive, which may protect the body of the polarizer 3 from damage due to external forces. The polyvinyl alcohol film layer 33 (i.e., PVA film) plays a polarizing role and is the core part of the polarizer 3, which determines the key indexes such as the polarizing performance, transmittance, and color tone of the polarizer 3. The material of the second protective film layer 34 may be one or any combination of triacetate (TAC), polyethylene terephthalate (PET), acrylic, and cycloolefin polymer, which is not limited herein. The second protective film layer 34 is a support of the PVA film, ensuring that the PVA film does not retract. At the same time, the second protective film 34 protects the PVA film from moisture and ultraviolet light, and ensures the weather resistance of the polarizer.

Figure 5:
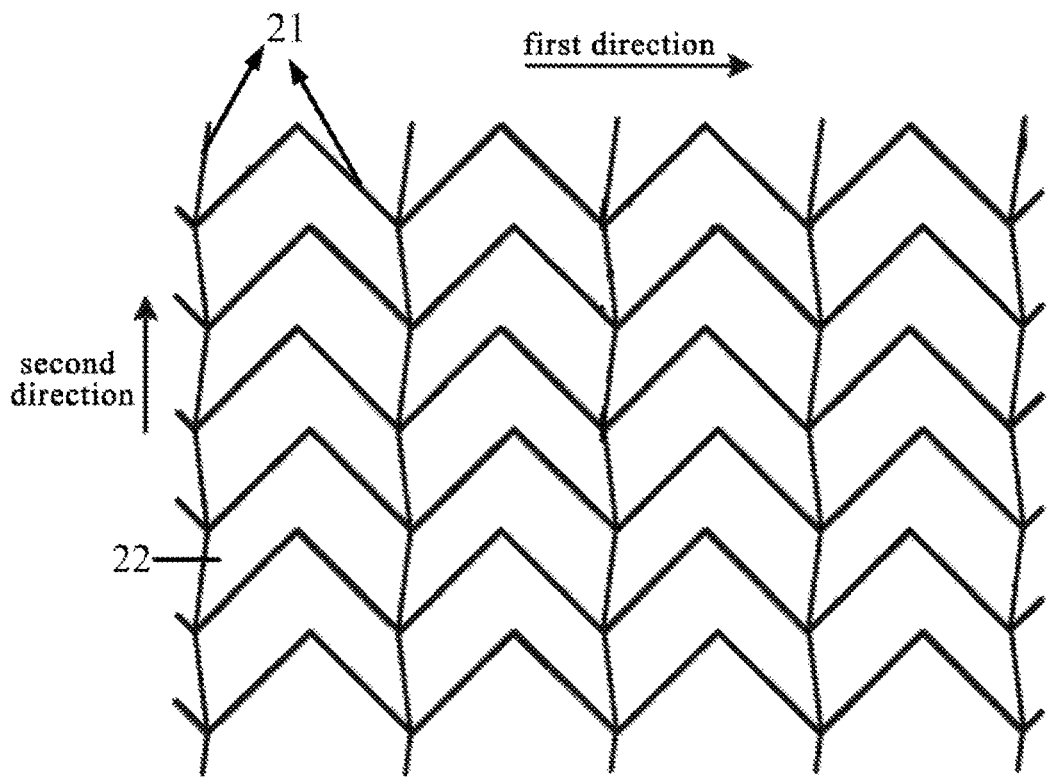
FIG. 5 is a schematic view showing the top view of the structure of the light control panel according to an embodiment of the present disclosure.
Figure 6:
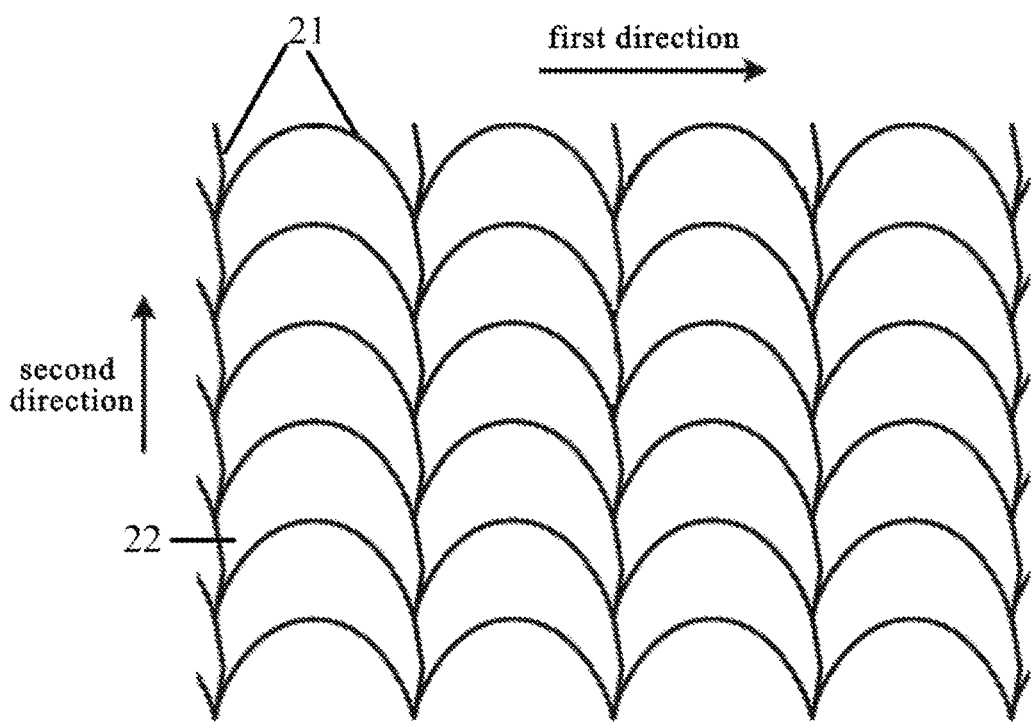
FIG. 6 is a schematic view showing the top view of the structure of the light control panel according to another embodiment of the present disclosure.

Optionally, the light control panel includes a plurality of signal lines extending along a first direction and a second direction that cross each other, and the plurality of signal lines is a zigzag wiring. As shown in FIGS. 5 and 6, the light control panel 2 includes a plurality of signal lines 21 extending along a first direction and a second direction that cross each other, and the plurality of signal lines 21 is a zigzag wiring. Since the signal lines extending along the first direction and the second direction are both zigzag wirings, a grid of signal lines extending along the first direction and the second direction is formed. The grid does not have the same or similar patterns as the grid formed by the gate lines and the data lines in the liquid crystal panel 1. Therefore, the effect of eliminating moire pattern can be effectively improved, and the structure is simple and easy to manufacture. Based on this, the liquid crystal display panel provided by the embodiments of the present disclosure can control the direction or strength of the backlight incident on the liquid crystal panel 1 without the need to add an additional film layer specifically for eliminating moire pattern to achieve a better moire pattern elimination effect.

In the above liquid crystal display panel provided by the embodiment of the present disclosure, as shown in FIGS. 5 and 6, the light control panel 2 may further include a plurality of light control units 22 defined by the signal line 21. The liquid crystal panel 1 includes a plurality of grid lines (for example, gate lines and data lines) extending alone a first direction and a second direction that cross each other, and the grid lines define a plurality of sub-pixel units, N of the plurality of sub-pixel units continuously arranged along the first direction form one pixel unit, and N is a positive integer. The plurality of pixel units and the plurality of light control units 202 are arranged in an array, respectively. A maximum length of one light control unit 22 along the first direction is m times a length of one pixel unit; and a width of one light control unit 22 along the second direction is n times a width of one pixel unit; and m and n are positive integers. That is, the maximum length LEN1 of one light control unit 22 along the first direction is equal to the sum of the lengths of m consecutively arranged pixel units; and the width LEN2 of one light control unit 22 along the second direction is equal to the sum of the widths of n consecutively arranged pixel units 6. Therefore, one light control unit 22 corresponds to m*n consecutively arranged pixel units 6 (i.e., continuous m columns and n rows of pixel units 6). For example, in a direction perpendicular to the display surface of the display panel, the starting position and the ending position of each light control unit 22 are also the starting position and the ending position of the corresponding m*n consecutively arranged pixel units.

Figure 7:
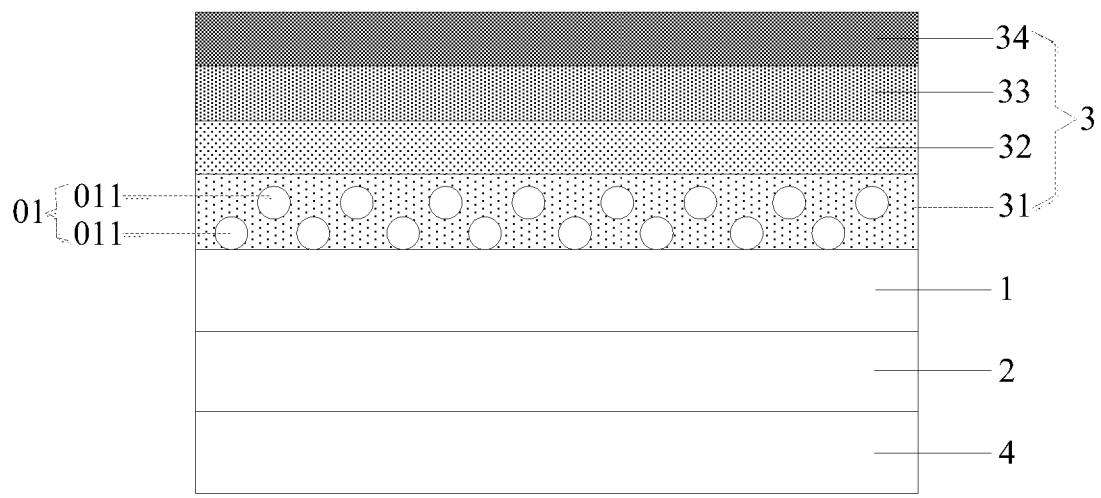
FIG. 7 is a schematic view showing the structure of the display device according to an embodiment of the present disclosure.
Figure 8:
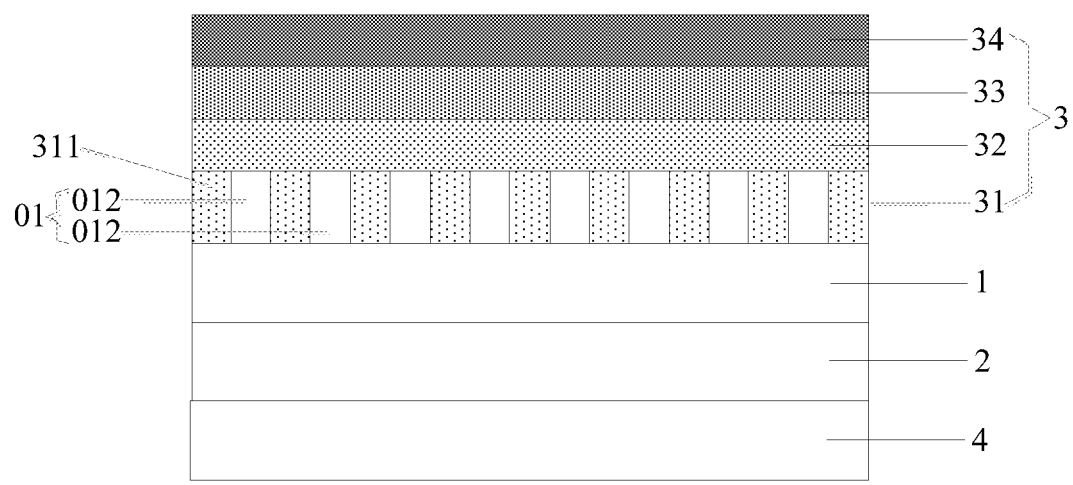
FIG. 8 is a schematic view showing the structure of the display device according to another embodiment of the present disclosure.

Based on the same inventive concept, an embodiment of the present disclosure also provides a display device. As shown in FIGS. 7 and 8, it includes the backlight module 4 and any of the above-mentioned liquid crystal display panels provided by the embodiments of the present disclosure. The backlight module 4 is located on the surface of the light control panel 2 away from the liquid crystal display panel. The principle of the display device to solve the problem is similar to that of the above-mentioned liquid crystal display panel. Therefore, the implementation of the display device can be referred to the implementation of the aforementioned liquid crystal display panel, which will not be reiterated herein.

The above display device provided by the embodiment of the present disclosure may be a mobile phone, a tablet computer, a television, a display, a notebook computer, a digital photo frame, a navigator, or any product or component having a display function. Other essential components of the display device should be understood by those skilled in the art, and thus will not be reiterated herein, nor should be construed as limiting the present disclosure. As for the implementation of the display device, reference may be made to the above embodiment of the display panel, and thus will not be reiterated herein.

In the liquid crystal display panel and the display device provided by the embodiments of the present disclosure, the propagation path of light emitted from the liquid crystal panel is adjusted by providing a light adjustment structure in the pressure-sensitive adhesive layer, and the light emitted from the vertical and inclined viewing angles of the liquid crystal panel can be mixed and emitted uniformly after passing through the light adjustment structure, so that the light output rate and the color performance of the sub-pixel unit in the liquid crystal panel viewed from different angles by the human eye is same and uniform. Therefore, the liquid crystal display panel and the display device provided by the present disclosure can improve or even eliminate the rainbow pattern phenomenon, and improve the display quality of the liquid crystal display panel.

Obviously, it will be apparent to those skilled in the art that various modifications and changes can be made in the present disclosure without departing from the spirit and scope of the disclosure. Thus, if such modifications and variations of the present disclosure belong to the scope of the appended claims and equivalents thereof herein, the present application is intended to cover these modifications and variations.

The invention claimed is:

1. A liquid crystal display panel, comprising: a liquid crystal panel, a light control panel, and a polarizer located on a surface of the liquid crystal panel away from the light control panel that are stacked,
   wherein the polarizer comprises a pressure-sensitive adhesive layer in contact with the liquid crystal panel, and a light adjustment structure within the pressure-sensitive adhesive layer is configured to adjust a propagation path of light emitted from the liquid crystal panel by means of refraction or total reflection,
   wherein the pressure-sensitive adhesive layer comprises a plurality of strip-shaped columnar pressure-sensitive adhesive structures and a plurality of strip-shaped columnar via holes that are closely arranged alternately, and the light adjustment structure comprises a plurality of columnar scattering structures filled in the plurality of strip-shaped columnar via holes.

2. The liquid crystal display panel of claim 1, wherein a width of the columnar scattering structure is in a range from 1 μm to 40 μm, and a height of the columnar scattering structure is in a range from 10 μm to 100 μm.

3. The liquid crystal display panel of claim 1, wherein a ratio of a weight of the light adjustment structure to a weight of the pressure-sensitive adhesive layer is in a range from 5% to 15%.

4. The liquid crystal display panel of claim 1, wherein a refractive index of the light adjustment structure is in a range from 1.5 to 2.0.

5. The liquid crystal display panel of claim 4, wherein a material of the light adjustment structure is a transparent material.

6. The liquid crystal display panel of claim 5, wherein the transparent material is acrylic resin or silica.

7. The liquid crystal display panel of claim 1, wherein the polarizer further comprises a first protective film layer, a polyvinyl alcohol film layer and the second protective film layer that are sequentially stacked on a surface of the pressure-sensitive adhesive layer away from the liquid crystal panel.

8. The liquid crystal display panel of claim 7, wherein the light control panel comprises a plurality of signal lines extending along a first direction and a second direction that cross each other, and the plurality of signal lines is a zigzag wiring.

9. The liquid crystal display panel of claim 8, wherein the light control panel further comprises a plurality of light control units defined by the plurality of signal lines that are intersected,
   wherein the liquid crystal panel comprises a plurality of grid lines extending along the first direction and the second direction that cross each other, the plurality of grid lines defines a plurality of sub-pixel units, N of the plurality of sub-pixel units continuously arranged along the first direction form one pixel unit, and N is a positive integer,
   wherein the plurality of pixel units and the plurality of light control units are arranged in an array,
   wherein along the first direction, a maximum length of one of the plurality of light control units is m times a length of one of the plurality of pixel units; along the second direction, a width of one of the plurality of light control units is n times a width of one of the plurality of pixel units; and m and n are positive integers.

10. A display device comprising a backlight module and the liquid crystal display panel of claim 1, wherein the backlight module is located on a surface of the light control panel away from the liquid crystal display panel.

11. The display device of claim 10, wherein a width of the columnar scattering structure is in a range from 1 μm to 40 μm, and a height of the columnar scattering structure is in a range from 10 μm to 100 μm.

* * * * *